Dec. 30, 1952 K. SCHLESINGER 2,623,942

COLOR CONTROL FOR TELEVISION SYSTEMS

Filed Nov. 3, 1947 2 SHEETS—SHEET 1

INVENTOR.

Kurt Schlesinger,

BY

Foorman L. Mueller Atty.

Dec. 30, 1952 K. SCHLESINGER 2,623,942

COLOR CONTROL FOR TELEVISION SYSTEMS

Filed Nov. 3, 1947 2 SHEETS—SHEET 2

INVENTOR.
Kurt Schlesinger,
BY
Zoorman L. Mueller Atty.

Patented Dec. 30, 1952 2,623,942

UNITED STATES PATENT OFFICE 2,623,942

COLOR CONTROL FOR TELEVISION SYSTEMS

Kurt Schlesinger, Maywood, Ill., assignor to Motorola, Inc., Chicago, Ill., a corporation of Illinois Application November 3, 1947, Serial No. 783,813

10 Claims. (Cl. 178—5.4)

This invention relates generally to color control systems and more particularly to an arrangement for providing different color fields in rapid succession as required in a sequential color television system.

To produce color television it has been proposed to use a sequential system in which red, green, and blue picture fields are produced in rapid succession so that the complete color spectrum can be reproduced. For a practical system the three fields must all be produced in a cycle of only $\frac{1}{60}$ of a second or $\frac{1}{180}$ of a second for each color. Mechanical systems have been proposed in which color filters are moved in succession in front of a television screen, but these systems have not been entirely successful because they are large and as they must be moved rapidly, they are not easily synchronized.

It is, therefore, an object of the present invention to provide a method of producing fields of various colors in rapid succession without the use of mechanically moving parts.

A further object of this invention is to provide a diffraction grating in a transparent medium which may be controlled to transmit various desired colors.

Another object of the present invention is to provide an ultrasonic interferometer which may be synchronzed with a television receiver to provide picture fields of various colors in rapid succession.

A feature of this invention is the provision of a transparent medium and a transducing device for producing vibrations therein so that nodal planes are set up in the medium which form an effective diffraction grating.

A further feature of this invention is the method of producing color separation by providing vibrations of definite frequency in a transparent medium and synchronously modulating a light source so that the light strikes the medium at the instant of maximum vibration of the medium.

Another feature of this invention is the provision of a liquid having low sound velocity with an emulsion of heavy particles therein, and means for providing vibrations in the liquid so that the particles come to rest in the nodal planes formed in the liquid which are spaced an integral multiple of optical half wave lengths apart.

A still further feature of this invention is the provision of a pair of transparent bodies in which gratings are formed by vibrations produced therein, with the vibrations in the two bodies being out of phase with respect to each other so that when the amplitude of vibration in one body is zero substantial vibrations will be produced in the other body.

Further objects, features and advantages will be apparent from a consideration of the following description taken in connection with the accompanying drawings in which.

In practicing the invention a system is provided for producing color fields in rapid succession by setting up vibrations in a transparent medium so that nodal planes are formed therein. By using ultra high frequency or ultrasonic vibrations, the nodal planes are spaced to form a diffraction grating which is suitable for color selection, with the colors being selected by proper choice of frequency. As the vibrations forming the nodal plane will go through a cycle of from zero to maximum value, the light beam may be modulated so that it strikes the grating only during maximum vibrations for most satisfactory results. Alternatively, heavy particles may be suspended in a liquid in which the oscillations or vibrations are produced to form a structural grating which remains in position continuously, and modulation of the light source is not required. In a still further modification, a pair of diffraction gratings are provided and arranged in series so that the vibrations therein are out of phase and substantial vibrations are provided in one of the gratings at all times.

Figures 1, 2, 3:
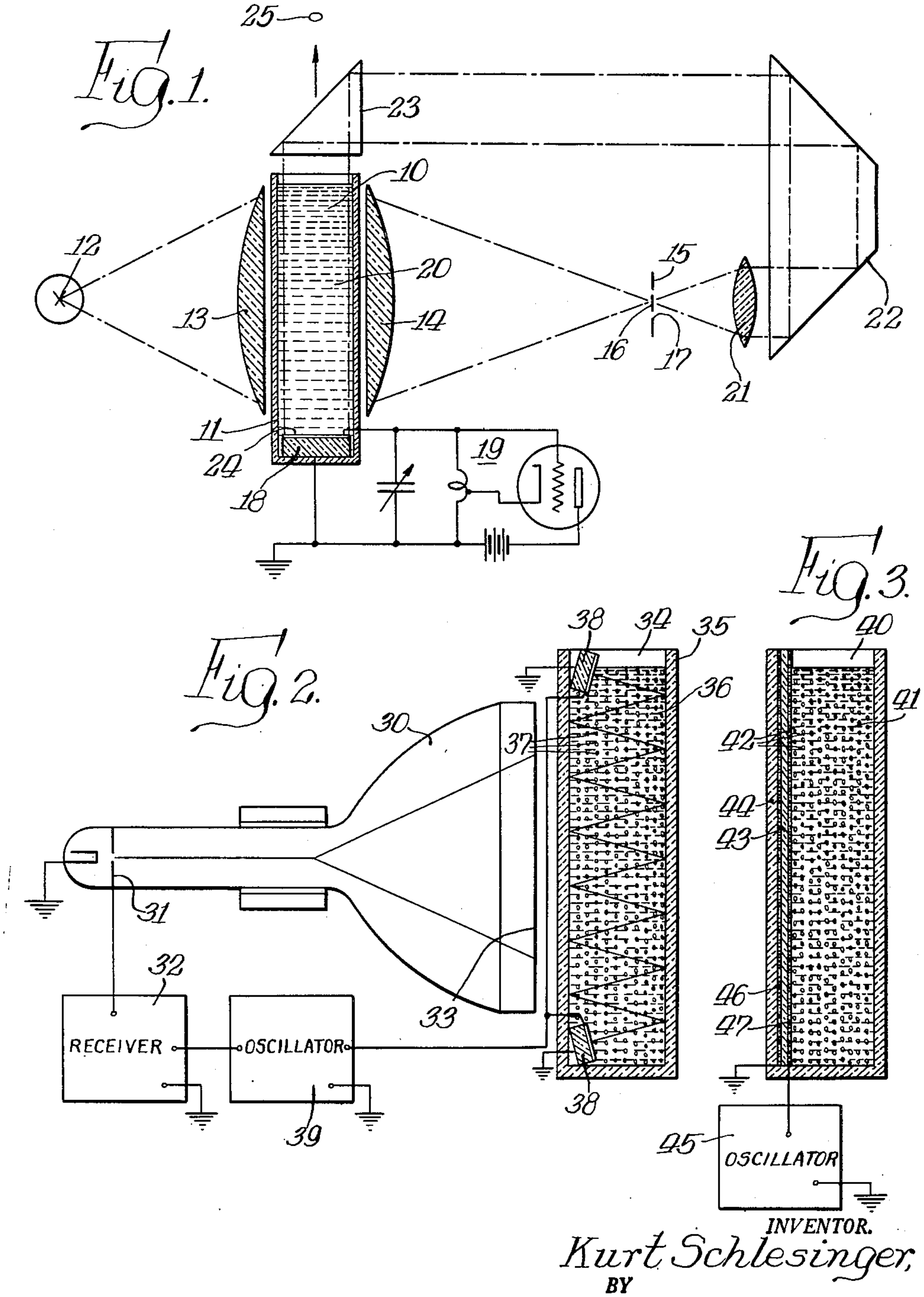
Fig. 1 illustrates a system for modulating light rays and forming a diffraction grating for providing color separation thereof.
Fig. 2 illustrates a diffraction grating suitable for use with a television receiver.
Fig. 3 illustrates a modified structure generally similar to Fig. 2.

Referring now more particularly to the drawings, in Fig. 1 there is illustrated a system for providing a diffraction grating in a transparent medium and means for introducing light therein. The transparent medium may be a liquid with low sound velocity such as carbon tetrachloride. The liquid 10 is contained in a trough 11 which is made of a transparent material so that light may pass therethrough. A source of light is provided at 12, the light from which is passed through a condenser lens 13, the trough 11, liquid 10, and a second lens 14 to a diaphragm 15. The diaphragm includes a central portion 16 which blocks the ordinary light beam from the lens 14 and an annular opening 17 which allows the diffracted light to pass therethrough. For setting up vibrations in the liquid an electromechanical transducer such as a quartz crystal 18 is provided which is connected to an oscillator circuit generally indicated as 19. When energized by the oscillator 19, the crystal transducer 18 will produce standing waves in the liquid forming a density pattern which is periodic both as to time and space. The horizontal lines 20 in the liquid 10 represent the nodal planes of the standing waves produced in the liquid. The diffraction of the light in the liquid caused by the vibration therein will produce secondary images which are slightly displaced from the primary image and will pass through the opening 17 in the diaphragm 15. Light admitted through the diaphragm is projected through the lens 21 to the prism 22 and from the prism 22 to prism 23 which again projects the light into the liquid 10. The nodal planes in the liquid 10 formed by the standing waves therein become in effect a diffraction grating with the spacing between the grating depending upon the frequency of the oscillator 19. The light is, therefore, passed through the grating to the silvered surface 24 on the crystal 18 by which it is reflected. It is apparent that by proper positioning of the prisms, the optical path length traversed by a light ray from the time it passes horizontally through the liquid 10 in one direction to the time when it is passed downwardly in the liquid can be such that light is introduced into the diffraction grating only when maximum vibration is taking place in the liquid. By proper selection of the frequency of the oscillator and the corresponding spacing of the grating formed in the liquid 10, color selection can be obtained as the grating will transmit only one color for a particular frequency of vibration. This color can then be observed at point 25.

In Fig. 2 there is illustrated an embodiment of the invention which is adaptable for use to provide different color fields in rapid succession in a sequential color television system. In Fig. 2 the television receiver tube is indicated at 30 having a grid 31 coupled to a receiver 32. The television receiver circuit may be of any suitable standard design and the particular construction thereof is not a part of this invention. The tube 30 is adapted to form an image on screen 33 which changes to conform to the transmitted picture. For providing color fields for the receiver tube, the diffraction grating 34 is provided comprising a trough 35 filled with a liquid 36. The liquid must be one having a low sound velocity such as carbon tetrachloride and has suspended therein a fine emulsion of heavy particles. The particles may be made of metal such as gold or a heavy liquid such as a heavy oil. These particles are indicated at 37. For setting up vibration in the liquid 36, crystal transducer units 38 may be provided. These units are positioned so that the vibrations are reflected back and forth between the sides of the trough to produce standing waves in said liquid substantially horizontally to produce vertical nodal planes in said liquid. The crystal transducers 38 are connected to an oscillator 39 which is coupled to receiver 32 to be synchronized thereby. When ultra high frequency oscillations are produced in the liquid 36, the heavy particles are swept away from the antinodes formed in the liquid and come to rest in the nodal planes. Therefore, the particles form a vertical structural diffraction grating in front of the picture tube. In order to provide an effective diffraction grating, the size of the particles should be small compared to the wave length of sound and large compared to the wave length of light. By selection of the frequency of oscillator 39, the spacing of the nodal planes in the liquid 36 can be controlled so that the diffraction grating transmits light of a particular frequency only, that is, light of one color only. In the sequential television system as has been proposed, the frequencies resulting in the different colors, red, green, and blue, will be provided in rapid succession and the diffraction grating 34 can be used to provide these fields by changing the frequency of the oscillator 39 in sequential order so that the diffraction grating transmits the desired color at the proper instant. As the diffraction grating formed in the liquid by the particles is an actual structural grating, it will be present at all times and, therefore, it is not necessary to modulate the light source as in the structure of Fig. 1.

Fig. 3 shows a modified diffraction grating 40 which, like the grating 34 of Fig. 2, is formed by a liquid 41 having heavy particles 42 suspended therein. The vibrations are produced in the liquid 41 by a micro crystalline layer 43 of piezoelectric material on one side of the trough 44. For energizing the layer 43, conductors 46 and 47 on either side thereof are provided. The conductor 46 may be a transparent coating applied directly on the side of the trough 44. The micro crystalline layer may be produced by sedimentation of crystals in a magnetic field which orients the crystals. Before aplying the conducting coating 47 it may be necessary to provide a smooth surface to the micro crystalline layer. It may be possible to use the liquid 41 as the other conductor and the coating 47 can then be eliminated. The micro crystalline layer 43 produces horizontal waves through the liquid 41 having vertical nodal planes along which the particles 42 come to rest. The micro crystalline layer 43 is energized by an oscillator 45 which may be identical with the oscillator 39 of Fig. 2 and can be controlled to provide vibration of the proper frequency to form diffraction gratings for transmitting the various colors as required. Functionally, the structure of Fig. 3 operates in exactly the same manner as the structure of Fig. 2.

Figure 4:
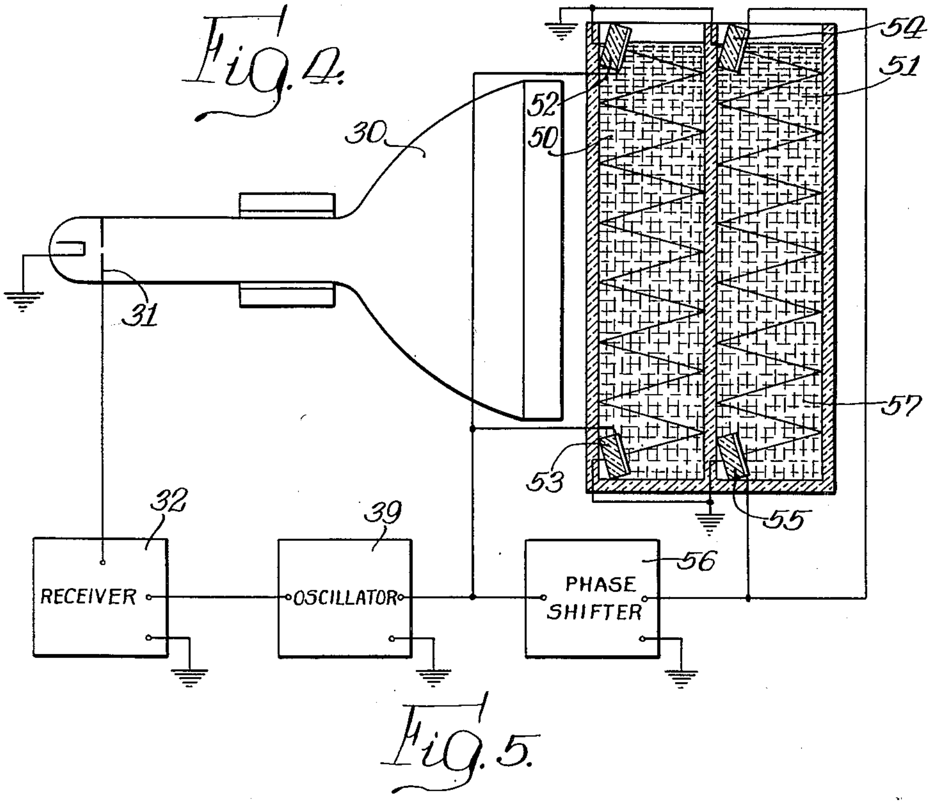
Fig. 4 illustrates a system in which a pair of diffraction gratings are provided.

In Fig. 4 there is illustrated a modified diffraction grating structure in which a double trough is provided for two bodies of liquid 50 and 51. The diffraction grating is placed in front of a receiver tube 30 which may be identical to the tube of Fig. 2 being connected to a receiver 32 which modulates the beam of the cathode ray tube through connection to the grid 31. The bodies of liquid 50 and 51 do not include particles suspended therein but have diffraction gratings formed by the nodal planes 57 produced by vibration of the liquid itself, in the same manner as generally explained in connection with Fig. 1. To eliminate the need for modulating the light introduced into the diffraction grating so that the light is introduced therein only when the vibration of the liquid is a maximum, the vibration is produced in the two bodies out of phase with respect to each other, preferably 90 degrees, so that when zero vibration occurs in one body, the vibration in the other will be substantial and an effective diffraction grating will be formed in one or the other of the bodies at all times. This phase displacement may be provided by connecting the crystal transducer units 52 and 53 for the liquid body 50 directly to the oscillator 39 and connecting the crystal transducers 54 and 55 for the liquid body 51 to the oscillator 39 through the phase shifter 56. Phase shifters suitable for this purpose are in themselves well known and will not be described in detail. As an example, a quarter wave resonant line could be used to provide the necessary phase shift. This will result in the zero vibrations in the two liquid bodies occurring at different times so that there will always be an effective diffraction grating formed in one or the other of the bodies.

Figure 5:
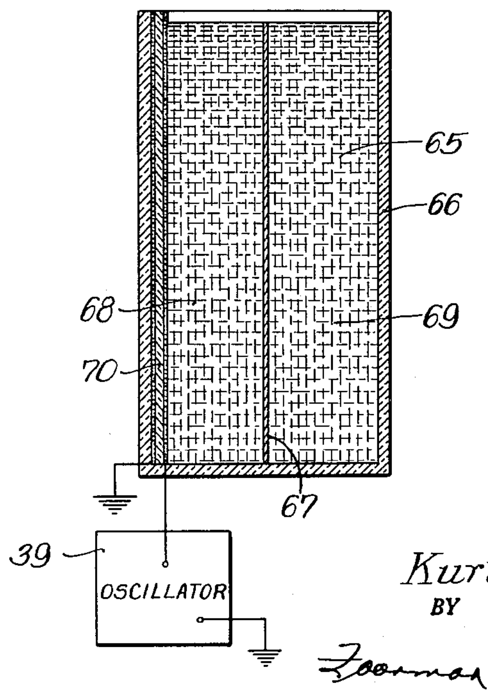
Fig. 5 shows a structural modification of the system of Fig. 4.

Physical means for providing a phase shift between two bodies of liquid, without the use of electrical phase shifting means as in Fig. 4, are illustrated in Fig. 5. In this figure the liquid 65 is provided in a container 66 having a central diaphragm 67 dividing the container into portions 68 and 69. Liquid is provided in both portions and a transducer such as a micro crystalline layer 70 is provided in the portion 68 for vibrating the liquid in this portion. The diaphragm 67 will allow the vibrations to be transmitted from the portion 68 to the portion 69, and by proper choice of the diaphragm thickness a phase shifting action can be provided so that the vibrations in the two portions 68 and 69 will be out of phase with respect to each other. This will produce the same effect as in Fig. 4 of providing an effective diffraction grating in one of the portions at all times.

In order to provide first order diffraction effects for color selection, the frequencies at which the vibrations must be produced in the transparent medium must be very high. To produce green, a frequency of 2000 megacycles is required, for red 1600 megacycles, and for blue 2400 megacycles. It is possible, however, to obtain diffraction phenomena at lower frequencies if sufficient energy is provided to produce distortion so that the density distribution in the liquid is no longer sinusoidal. For example, frequencies of 200, 160 and 240 megacycles may be used for green, red, and blue, respectively, if the vibrations produced in the liquid have sufficient energy so that the point of cavitation is approached. The grating thus formed is spaced at a multiple of an optical half wave and is effective to provide color separation. This phenomenon is known having been described in texts as, for example, "Principle of Physics" by Francis Weston Sears, volume 3, Optics, published by Addison-Wesley Press, Cambridge, Massachusetts, 1946.

It is to be pointed out that the use of particles in a liquid to produce a structural grating or the use of a pair of bodies so that substantial vibrations occur at all times in one of the bodies is not necessary if sufficiently strong vibrations are produced so that actual tearing of the liquid occurs. Tearing of the liquid by very strong vibrations may form a structural grating similar to the grating formed by the particles suspended in the liquid eliminating the need for modulation of the light or for other means to provide an effective grating at all times.

As previously stated, the frequency of the vibrations in the transparent medium controls the spacing of the grating and, therefore, the color selected by the grating. To provide picture fields of the primary colors, red, blue, and green, in rapid succession as required for a sequential television system, it would be necessary that the frequency applied to the transducer be changed in steps in synchronism with production of the corresponding images by the television receiver tube. Although an oscillator in which the frequency can be changed in steps to produce the desired effects can be provided, it may be preferable to provide three separate oscillators and a gating system for connecting the oscillator of the proper frequency to the transducing device in rapid succession. Systems of this type are known, one such system being described by Howland in "Electronics" magazine for July 1947, page 138. Circuits for providing such sequential operation are well known and need not be described in detail here.

It is seen from the above that there is provided an ultrasonic interferometer which is effective to provide color selection. The arrangement is applicable for use in a sequential color television receiver to provide the required color fields. The system is applicable to large tubes as used for direct viewing and to smaller tubes used in projection systems. The required structure may be small, does not include moving parts, and is easily synchronized with the television receiver so that the proper colors always appear. The system can change from one system to another very fast so that the change can take place during the vertical scanning blanking period. Although the medium in which the grating is set up has been described as being a liquid, it is obvious that transparent solids may also be used to produce the same effect.

While I have described certain embodiments of my invention which are illustrative thereof, it is obvious that various changes and modifications can be made therein without departing from the intended scope of the invention as defined in the appended claims.

I claim:

1. Color selecting apparatus adapted to transmit light of a particular color comprising, container means including transparent wall portions forming a pair of liquid receiving chambers positioned adjacent each other, first and second bodies of transparent liquid individually positioned in said liquid receiving chambers, means for producing waves of vibration of a predetermined frequency in said first body in one direction, and means for producing waves of vibration of said predetermined frequency and in said one direction in said second body, said waves of vibration in said second body being out of phase with said waves in said first body so that when the vibration in one of said bodies is at minimum amplitude the vibration in the other of said bodies is substantial, said waves in said bodies having nodes located in spaced parallel planes to form a plurality of layers which transmit light of said particular color.

2. Color selecting apparatus adapted to transmit light of a particular color comprising, container means including transparent wall portions forming a pair of liquid receiving chambers positioned adjacent each other, first and second bodies of transparent liquid individually positioned in said liquid receiving chambers, means for producing waves of vibration of a predetermined frequency in said first body in one direction, means for transmitting vibrations from said first body of liquid to said second body of liquid to produce vibrations therein in a direction parallel to said one direction, said last mentioned means being arranged to shift the phase of said waves of vibration so that when the vibration in one of said bodies is at minimum amplitude the vibration in the other of said bodies is substantial, said waves in said bodies having nodes located in spaced planes to form a plurality of layers which transmit light of said particular color.

3. Color selecting apparatus adapted to selectively transmit light which strikes said apparatus in one direction and which includes a plurality of predetermined colors comprising, a transparent liquid, particles suspended in said liquid, means for producing waves of vibration in said liquid in said one direction having nodes located in spaced parallel planes extending perpendicular to said one direction, said particles being held in said planes by said vibration to form a plurality of layers which transmit light of a single color only, and means for controlling the frequency of said wave producing means so that the thickness of said layers is controlled to selectively transmit light to said predetermined colors.

4. Color selecting apparatus adapted to receive light from one direction and transmit light of a predetermined frequency only comprising, a transparent liquid, heavy particles suspended in said liquid, said particles having a diameter greater than the wave length of light and smaller than the wave length of sound, and means for producing waves of vibration in said liquid in said one direction so that nodes are produced which are located in spaced planes, said heavy particles being held in said planes by said waves to form a plurality of layers which transmit light of a single frequency only, said waves of vibration being of such frequency that said layers have the thickness required to transmit light of said predetermined frequency.

5. Color selecting apparatus for a television receiver for translating successive fields of white light individually corresponding in intensity to primary colors into a color picture, said apparatus including a transparent medium positioned in the viewing path of said fields of white light, means for producing ultra high frequency vibrations in said medium substantially in the direction of said viewing path to provide a plurality of spaced nodal planes therein which extend perpendicular to said viewing path, said nodal planes forming a plurality of layers in said medium extending perpendicular to said viewing path and spaced to transmit therethrough light of a single color only, and means for successively changing the frequency of said vibrations in synchronism with the fields of white light so that said layers are of such thickness at any instant to selectively transmit light of the primary color corresponding to the field of white light being displayed at the said instant.

6. Color selecting apparatus for a television receiver for translating successive fields of white light individually corresponding in intensity to the primary colors into a color picture, said apparatus including, a transparent medium positioned in the viewing path of said fields of white light, a source of vibrations coupled to said medium for producing waves therein substantially in the direction of said viewing path, said waves providing a plurality of spaced parallel layers of different densities in said medium which extend perpendicular to said viewing path, said layers forming a diffraction grating for selectively transmitting light of a single color only, with the color depending on the thickness of said layers extending perpendicular to said viewing path, and means for successively changing the frequency of vibration of said source in synchronism with the fields of white light so that said layers are of such thickness at any instant to transmit light on the primary color corresponding to the field of white light being displayed at the said instant.

7. Color selecting apparatus for receiving white light from one direction and for translating the white light into light of particular colors, said apparatus including a transparent medium, a source of vibrations coupled to said medium for producing waves therein to provide a plurality of spaced nodal planes in said medium which extend perpendicular to said one direction, said nodal planes forming a plurality of layers in said medium extending perpendicular to said one direction and spaced to transmit light of a single color only, and control means for said source of vibrations for successively changing the frequency thereof to thereby change the thickness of said layers so that said layers transmit light on said predetermined colors in sequence.

8. Color selecting apparatus for receiving white light from one direction and transmitting light of a predetermined color only including a transparent medium, a source of vibrations coupled to said medium for producing waves therein in said one direction, said waves providing spaced parallel layers of different density in said medium which extend perpendicular to said one direction and which form a defraction grating for selectively transmitting light of a particular color which depends upon the thickness of said layers, and control means for said source for controlling the frequency thereof so that said layers extending perpendicular to said one direction have the thickness required to transmit light of said predetermined color only.

9. Color selecting apparatus for receiving white light from one direction and for transmitting light of a predetermined color only including, a transparent medium, a source of vibrations coupled to said medium for producing waves therein in said one direction, said waves providing a plurality of parallel spaced nodal planes which extend perpendicular to said one direction and form a plurality of layers in said medium extending perpendicular to said one direction and which selectively transmit light of a single predetermined color depending upon the thickness of said layers, and control means for said source for controlling the frequency thereof so that said layers have the thickness required to transmit light of said predetermined color.

10. Color selecting apparatus for receiving white light from one direction and for transmitting light of a predetermined color only including a transparent medium, means for producing waves of vibration in said medium in said one direction to provide a plurality of parallel spaced nodal planes which extend perpendicular to said one direction, said nodal planes forming a plurality of layers in said medium extending perpendicular to said one direction, said layers forming an interferometer which transmits light of a single color only, means for controlling the frequency of said vibrations so that said layers have the thickness required to transmit said predetermined color, and means for modulating said white light in synchronization with said vibrations and for applying said light to said medium only when said waves of vibration are of maximum amplitude.

KURT SCHLESINGER.

(References on following page)

REFERENCES CITED

The following references are of record in the file of this patent:

UNITED STATES PATENTS

| Number | Name | Date |
|---|---|---|
| 2,109,540 | Leishman | Mar. 1, 1938 |
| 2,155,660 | Jeffree | Apr. 25, 1939 |
| 2,213,070 | Farnsworth | Aug. 27, 1940 |
| 2,290,582 | Donal | July 21, 1942 |
| 2,350,892 | Hewson | June 6, 1944 |
| 2,513,520 | Rosenthal | July 4, 1950 |
| 2,528,510 | Goldmark | Nov. 7, 1950 |

FOREIGN PATENTS

| Number | Country | Date |
|---|---|---|
| 473,061 | Great Britain | Oct. 5, 1937 |